Patented Nov. 2, 1937

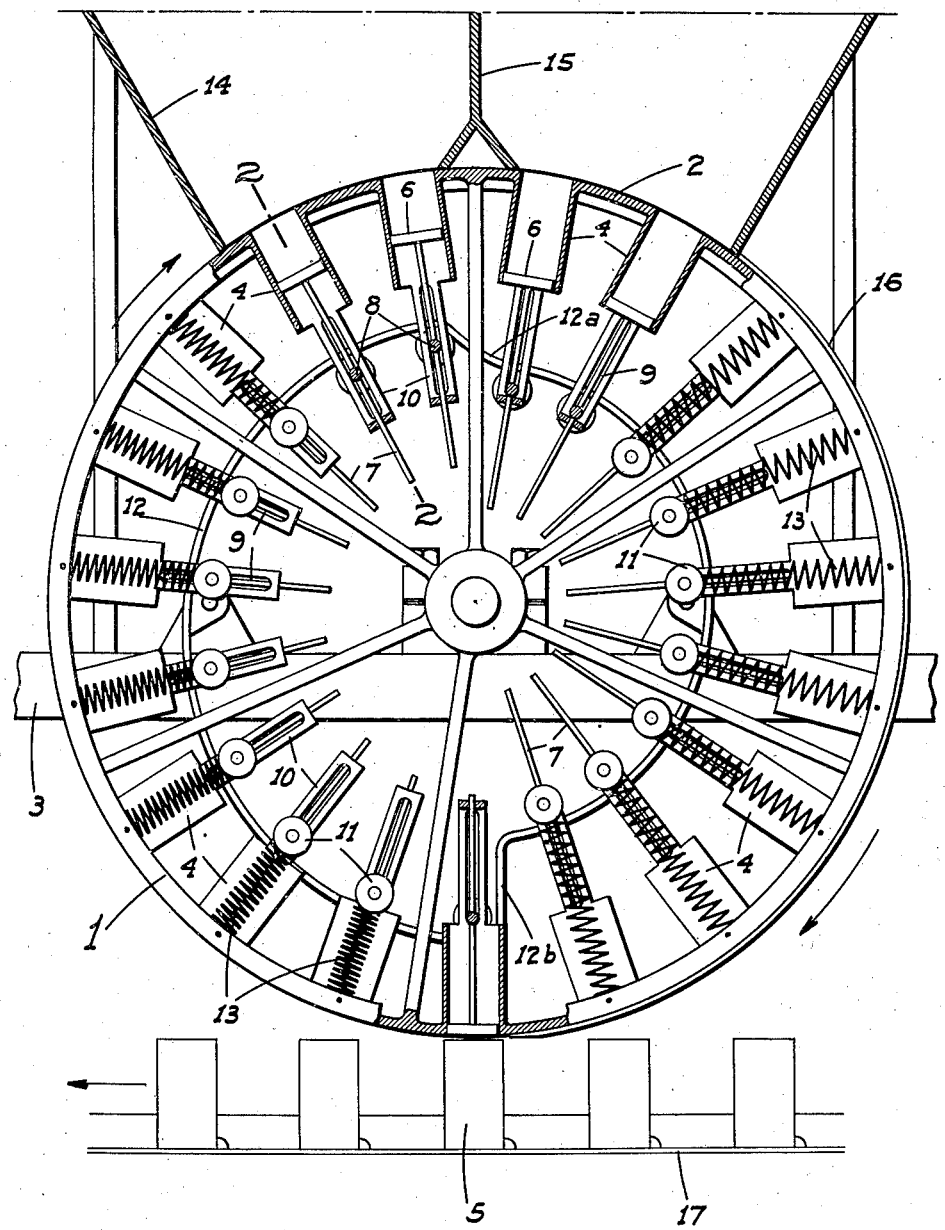

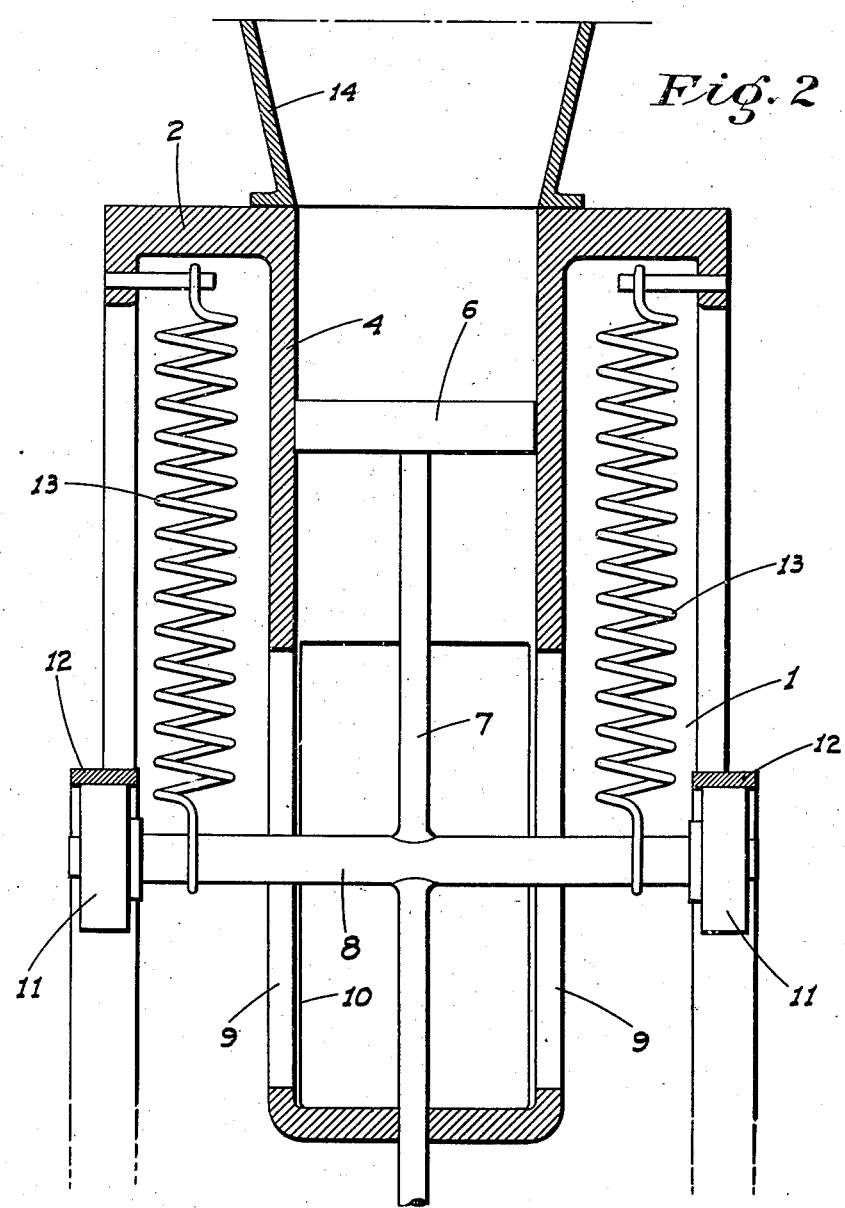

2,097,887

UNITED STATES PATENT OFFICE 2,097,887

CAN FILLING MACHINE

Wilbur E. Lacey, Oakland, Calif., assignor to George A. Dow

Application September 21, 1935, Serial No. 41,583

5 Claims. (Cl. 226—100)

This invention relates to can filling devices for use in canneries, my principal object being to provide a machine by means of which accurately measured amounts of fruits, vegetables or other products being canned will be fed from a supply hopper to the cans automatically and without any hand work being necessary.

Some products are mixed when canned, such as what is known as "fruit cocktail," succotash, peas and carrots, etc., and another object of my invention is to provide a machine constructed so that the proper proportions of the different products will be taken from the respective hoppers and fed into the cans, all in a single continuous operation and without any hand measuring, double handling of the cans, or other time taking and costly operations being resorted to.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of my improved machine partly in section and with the near cam track and wheel support removed.

Figure 2 is an enlarged fragmentary transverse section of the machine taken on the line 2—2 of Figure 1.

Referring now more particularly to the characters of reference on the drawings, the machine comprises essentially a wheel 1 having a relatively wide exteriorly smooth rim 2; the wheel being turnably supported in any suitable manner from frames at the sides of the wheel, one of which frames is indicated at 3. The wheel is driven by any suitable means at a relatively low speed or about 4 R. P. M.

Depending inwardly from the rim of the wheel rigid therewith and radially thereof are cylinders or cups 4, evenly spaced about the periphery of the rim. The internal dimensions of the cups are substantially the same as those of the cans 5 to be filled, it being understood that any one machine is intended for use with a certain sized can only. At the same time without any changes in the essential features or construction of operation, the machine may be made to be used with any sized cans used in the industry, and although I have shown in the present instance a wheel having a single row of cups, it may obviously be made with two or more transversely separated rows if desired.

Each cylinder or cup has a plunger 6 therein, the rod 7 of the plunger extending inwardly beyond the bottom of the cup and being connected to a cross bar 8 which is disposed parallel to the axis of the wheel. The bar rides in guide slots 9 formed radially of the wheel in skirts 10 depending from the cups, the length of these slots being substantially equal to the length of the cups. At its ends the bar carries rollers 11 which ride inside of endless cam tracks 12, which are removably secured on the frames 3 in any suitable manner. Tension springs 13 are connected to the wheel adjacent the rim and to the cross bar to the sides of the cup, said springs tending to move the plunger outwardly of the cup or to the top thereof; the slots limiting such movement of the plunger. The cam tracks are of special form as will be hereinafter shown, so as to control or resist the action of the springs and the accompanying movement of the plungers of the different cups in a predetermined manner with the rotation of the wheel.

Secured above the wheel and delivering onto the upper periphery of the rim is a hopper 14 which may be divided into separate compartments, extending circumferentially of the wheel, by one or more partitions 15. A shield plate 16 extends about and is in close engagement with the downwardly moving side of the wheel rim from the adjacent wall of the hopper to adjacent the bottom of the wheel, or so that the loaded cups will only move clear of the shield when completely inverted and are vertically disposed as shown in Figure 1.

In a device constructed as shown and arranged to fill cans with a two-ingredient mixture, the cam tracks are designed so that as the cups pass under the first compartment of the hopper, the plungers will be disposed intermediate the ends of the cups, or so that the produce from said compartment and falling into the cups successively exposed to the same, can only partially fill the cups.

Between the two hopper compartments the cam tracks are formed with an abrupt drop, as at 12a in Figure 1, which causes the plungers to be lowered to the bottom of the cups as the wheel rotates; the produce already received in the cups of course following the plungers. The produce from the next hopper compartment will then drop into the partially filled cups to complete the filling of the same.

The tracks are then designed to maintain the plungers at the bottom of the cups as the latter pass about the shield 16, or until the cups have become completely inverted and are in a vertical position at the bottom of the wheel. The cam tracks then have a sudden break as at 12b to release the rollers 11 of each cup arriving at such position. The springs 13 of each cup then act to suddenly advance the corresponding plunger and expel the contents of the cup into the can 5 below. It is to be understood that the cans 5 are supported in a position close to the wheel on a conveyor 17, which is moved by suitable means in timed relation to the movement of the wheel so that successive cans will be disposed in vertical alinement with successive cups to receive the contents thereof as such contents are expelled by the release of the plunger. At the same time however if desired the cans may be moved into receiving position by hand. The cam tracks are then arranged so that after the contents of the cups have been expelled, the plungers are gradually advanced in the cups until they reassume the initial filling position under the first hopper compartment.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A can filling machine comprising a rotatable wheel set on a horizontal axis, a plurality of cups to receive produce projecting inwardly from and disposed in spaced relation about the rim of the wheel, a produce hopper mounted above the wheel to deliver to the adjacent cups, means to divide the hopper into spaced compartments extending circumferentially about the wheel, plungers in the cups, means functioning with the rotation of the wheel to hold the plungers intermediate the ends of the cups as the latter successively pass under the first hopper compartment and to then move the plungers to the bottom of the cups as the latter pass under the last hopper compartment, and to hold the plungers in said position until the cups assume an inverted position at the bottom of the wheel, and means to prevent spilling of the contents from the cups until they assume such inverted position for the discharge of their contents.

2. A machine for filling cans with different ingredients including, in combination, a container provided with a plunger constituting a movable bottom to the container and the contents of the container corresponding to the volume of the can to be filled, a succession of hoppers each containing an ingredient to go into the can, means whereby the container is made to traverse the discharge openings of the respective hoppers and successively to receive its pro rata of the respective hopper contents, and means for delivering the contents of the container directly into a can.

3. A machine for filling cans with measured quantities of different ingredients comprising, in combination, a container provided with a plunger constituting a movable bottom to the container, a succession of hoppers each containing an ingredient to go into the can, means whereby the container is made to traverse the discharge openings of the hoppers, means to withdraw the plunger a measured distance during the movement of the container past each discharge opening to measure the ingredients of each hopper received by the container, and means for delivering the contents of the container into a can.

4. A machine for filling cans with different quantities of different ingredients comprising, in combination, a container with a bottom movable to vary the capacity thereof, a succession of hoppers each containing an ingredient to go into the can, means for moving the container into registry successively with the hoppers, and means for moving the bottom of the container to increase its capacity a predetermined amount as it registers with each hopper to thereby measure the ingredient of each hopper passing into the container.

5. A machine for filling cans with different quantities of different ingredients comprising, in combination, a container with a bottom movable to vary the capacity thereof, a succession of hoppers each containing an ingredient to go into the can, means for moving the container into registry successively with the hoppers, means for moving the bottom of the container to increase its capacity a predetermined amount as it registers with each hopper to thereby measure the ingredient of each hopper passing into the container, and means for transferring the contents of the container directly to a can.

WILBUR E. LACEY.